(12) United States Patent
Melki et al.

(10) Patent No.: US 12,320,250 B2
(45) Date of Patent: Jun. 3, 2025

(54) INDIRECT MEASUREMENT SYSTEM FOR IDENTIFYING THE POSITION, DENSITY AND PRESSURE OF AN UNDERGROUND LIQUID OR GASEOUS INTERFACE

(71) Applicant: 9380-1934 QUEBEC INC., Bécancour (CA)

(72) Inventors: Ahmed Melki, Bécancour (CA); Sousso Kelouwani, Trois-Rivières (CA); Yves Dubé, Trois-Rivières (CA); Kodjo Agbossou, Trois-Rivières (CA)

(73) Assignee: 9380-1934 QUEBEC INC., Bécancour (CA)

( * ) Notice: Subject to any disclaimer, the term of this patent is extended or adjusted under 35 U.S.C. 154(b) by 0 days.

(21) Appl. No.: 17/998,740

(22) PCT Filed: Jul. 7, 2021

(86) PCT No.: PCT/CA2021/050926
§ 371 (c)(1),
(2) Date: Nov. 14, 2022

(87) PCT Pub. No.: WO2023/279187
PCT Pub. Date: Jan. 12, 2023

(65) Prior Publication Data
US 2024/0240553 A1    Jul. 18, 2024

(51) Int. Cl.
*E21B 47/06* (2012.01)
*E21B 47/047* (2012.01)
(Continued)

(52) U.S. Cl.
CPC ............ *E21B 47/06* (2013.01); *E21B 47/047* (2020.05); *E21B 49/081* (2013.01); *G01F 23/14* (2013.01);
(Continued)

(58) Field of Classification Search
CPC ...... E21B 47/06; E21B 47/047; E21B 49/081; G01F 23/14; G01F 23/168; G01N 9/26; G01L 19/0007
See application file for complete search history.

(56) References Cited

U.S. PATENT DOCUMENTS 3,330,352 A    7/1967   Bernard
4,006,636 A    2/1977   Holman
(Continued)

FOREIGN PATENT DOCUMENTS

CN    111457984 A    7/2020

OTHER PUBLICATIONS

Khamehchi et al., Selection of the Best Efficient Method for Natural Gas Storage at High Capacities Using TOPSIS Method, Gas Processing Journal, Jan. 2013, 10 pages, vol. 1, No. 1.
(Continued)

*Primary Examiner* — Helen C Kwok
(74) *Attorney, Agent, or Firm* — Lavery, de Billy, L.L.P.; Gonzalo Lavin

(57) ABSTRACT

A measuring system for determining a position (h), density (p) and pressure of an underground liquid or gaseous/liquid interface of a gas well or gas reservoir or pressurized tank. The system includes: an instrument panel (10) for measuring data parameters of said underground liquid or gaseous/liquid interface or gas reservoir or pressurized tank in real-time; a control panel (30) operatively connectable to the instrument panel (10) for collecting the data parameters in real-time from the instrument panel (10); and a correction algorithm configured to receive the data parameters and to determine the position, density and pressure of the underground liquid or gaseous/liquid interface or gas reservoir or pressurized tank so as to increase measurement accuracy thereof. Advan-
(Continued)

tageously, a single measuring hydrostatic tube tube is configured to fit into an opening of the gas well.

10 Claims, 10 Drawing Sheets

(51) Int. Cl.
| | |
|---|---|
| *E21B 49/08* | (2006.01) |
| *G01F 23/14* | (2006.01) |
| *G01F 23/16* | (2006.01) |
| *G01L 19/00* | (2006.01) |
| *G01N 9/26* | (2006.01) |

(52) U.S. Cl.
CPC ........ G01F 23/168 (2013.01); G01L 19/0007 (2013.01); G01N 9/26 (2013.01)

(56) References Cited

U.S. PATENT DOCUMENTS

| | | | |
|---|---|---|---|
| 4,694,692 A * | 9/1987 | Brown | G01N 9/28 |
| | | | 73/439 |
| 4,984,451 A | 1/1991 | Wilen et al. | |
| 5,634,522 A * | 6/1997 | Hershberger | E21B 47/009 |
| | | | 166/372 |
| 6,799,457 B2 | 10/2004 | Bouchard | |
| 8,340,929 B2 | 12/2012 | Smaidris et al. | |
| 2003/0121656 A1 * | 7/2003 | Hershberger | E21B 43/121 |
| | | | 166/250.03 |
| 2004/0065477 A1 * | 4/2004 | Paulk | E21B 21/08 |
| | | | 175/50 |
| 2010/0262387 A1 * | 10/2010 | Alstad | G01N 9/26 |
| | | | 702/55 |
| 2018/0180460 A1 * | 6/2018 | Bartlett | G01F 23/165 |

OTHER PUBLICATIONS

Thomas A. Huges, Level Measurement and control, Measurement and Control Basics, 3rd Edition, ISA Press, 147-169, 2002.

Kayser et al., Bubblers, Instrument Engineers Handbook Fourth Edition Volume One Process Measurement and Analysis, pp. 421-429, 2003.

CNSC Technical Training Group, Instrumentation Measuring Devices and Basic PID Control, Science and Reactor Fundamentals, Jan. 2003, 125 pages, Revision 1.

Boyes et al., Measurement of Level and Volume, Mechanical Measurements, 2010, p. 103-112, Elsevier inc.

William C. Dunn, Fundamentals of industrial instrumentation and process control, McGraw-Hill, 86-98, 2005.

Robert B. Northrop, Introduction to Instrumentation and Measurements, Second Edition, 7-13, 2005.

Canadian Intellectualproperty Office, The International Search Report and The Written Opinion, International Searching Authority, Apr. 4, 2022, 7 pages, Application No. PCT/CA2021/050926.

\* cited by examiner

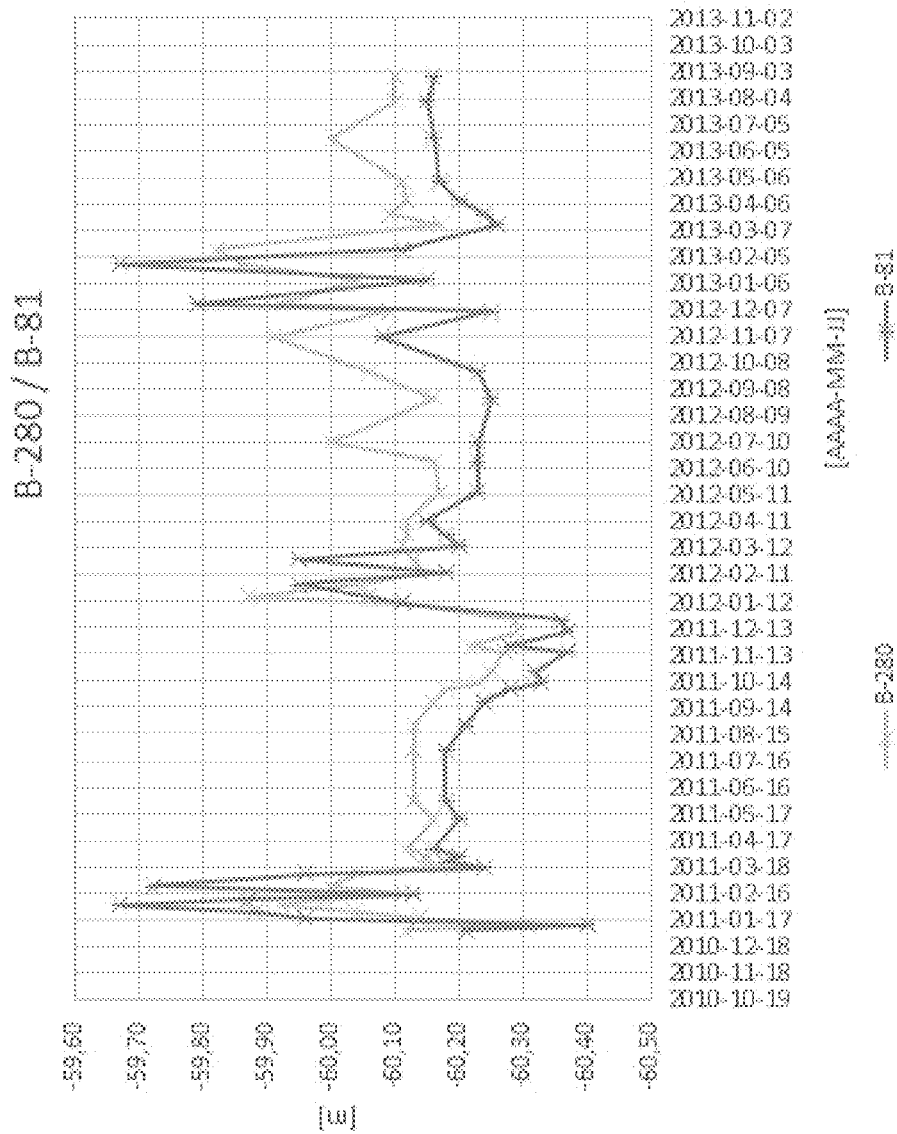

INDIRECT MEASUREMENT SYSTEM FOR IDENTIFYING THE POSITION, DENSITY AND PRESSURE OF AN UNDERGROUND LIQUID OR GASEOUS INTERFACE

CROSS-REFERENCE TO RELATED APPLICATION

This application is a National Entry Application of PCT application No. PCT/CA2021/050926 filed on Jul. 7, 2021 and published in English under PCT Article 21 (2). The document above is incorporated herein in its entirety by reference.

FIELD OF THE INVENTION

This invention relates generally to a measurement system for identifying the position, density and pressure of an underground liquid or gaseous interface in a hazardous, humid, high pressure and high temperature environment or in a pressurized tank.

BACKGROUND OF THE INVENTION

Quebec is a province of Canada that consumes more natural gas (NG) than it produces. In 2013, the largest users of NG are the commercial and industrial sectors, and demand is expected to increase in the coming years.

In order to remedy this lack of natural gas, managers of this type of fossil energy have resorted to storage, a tool that is of great importance both at the operational and commercial level. Indeed, at the operational level, the storage of natural gas is of great importance in the management of imbalances between supply and demand. For example, the longer the transport pipelines will be full each day of the year, the lower the unit cost of use. Storage effectively manages seasonal and daily gaps between supply and demand. On the other hand, and at the commercial level, storage makes it possible to take advantage of business opportunities present in the market. For example, it can reduce supply costs by buying and injecting gas in summer when demand and prices are low, and by withdrawing it in the winter when demand and prices are higher.

NG storage methods fall into two broad categories (Khamehchi E. et al., 2013): surface and subterranean storage. The surface storage is done in different tanks: liquefied natural gas (LNG) tank, pressurized tank, NG hydrate tank, tank with NG absorption, etc.

Underground storage involves the use of depleted aquifer or saline deposits. These storages are the most widespread, but they require very precise geological configurations. Therefore, the types of reservoirs selected depend on the available geological structures.

Intragaz of Quebec is a developer and operator of underground natural gas storage. It has developed a solid expertise in terms of: technical, economic and regulatory due to the geological complexity of the only two natural gas storage sites where it operates: Pointe-du-Lac in Trois-Rivières and Saint-Flavien in Quebec wherein natural gas has been reinjected into a secure geological structure that has been storing hydrocarbons for millions of years. The production wells are adapted to their new function and a site of operation (compression, dewatering, etc.) is installed to manage all the installations. The NG undergoes a movement of injection/withdrawal of wells as a result of periods of low or high energy demand. At high throughput, this injection/withdrawal motion gives an operational advantage.

The underground reservoir located at Pointe-du-Lac in Trois-Rivieres consists of unconsolidated sand established about 120,000 years ago, its thickness varies from a few meters to more than 10 meters; as for its depth, it varies between 60 and 120 meters. The high permeability and porosity of sand make this storage excellent for peak service. Given its injection and withdrawal capabilities, it is mainly used for winter peaks. It can also be used for seasonal volumes. The pressure in the tank is low (740 to 250 kPa) and remarkably lower than that of the transport pipeline (7,000 kPa), due to the shallowness (92 meters) of storage. As a result, the gas must be compressed during extraction and, conversely, expanded before being injected into the tank.

The NG trapped in the reservoir at the Pointe-du-Lac site in the porous, unconsolidated, dome-shaped sand zone lies between a layer of impervious clay (above) and the level of the ancient sea of Champlain (below). We can access the NG through several wells drilled on the site. The knowledge of the variable level of this aquifer represents a fundamental factor that guarantees the integrity of operations. Indeed, this level position is an indication of the amount of NG that has been stored at a specific pressure. To avoid gas losses (to other underground spaces) which could cause a lack of supply, it is advisable to store NG whose quantity does not exceed the safe limits of the tank. To do this, one must regularly measure the water level or gas/water interface level in the reservoir and manage its operations according to this fundamental data.

There are several liquid level measurement techniques on the market. The most common techniques that would apply to the water-NG interface are: mechanical float, differential pressure measurement, capacitive measurement, ultrasonic distance measurement, distance by infrared, etc.

The major drawbacks of known measurement techniques resides in the four following disadvantages: 1) these expose employees to a dangerous situation during measurement; 2) the overall dimensions of the majority of the equipment mentioned above do not allow measurement inside a gas well (for example a ⅜ inches maximum opening of wellhead measurement does not allow to insert a large-scale equipment i.e. the space requirement exceeding the space constraints); 3) the lack of precision of the measurements; 4) instability of their electronics parts inside a high-pressure and a high-humid environment. The known prior art techniques also have the following drawbacks: the need for calibration, the prior knowledge of the density or the chemical composition of the liquid, the electrical energy used exceeding the limit allowed in explosive gas, sensitivity to environmental parameters (pressure, temperature, chemical composition of the medium, etc.), reduced accuracy due to the range of variation of the liquid level.

Referring now to FIG. 1, there is shown a prior art mechanical float measurement system installed in a gas well. A single pressure floating sensor S1 is installed at the water level WL of the interface between the natural gas NG and water W. Although this measurement system is relatively inexpensive, it exposes employees to a very dangerous situation during the measurement because they need to open the wellhead each time when a measurement is taken. Indeed, these manual measurement methods are performed under special conditions caused by the explosive nature of the gas inside the well measurement. Two factors make accessibility to the gas-water interface difficult: first, the presence of a highly explosive gas at a high pressure. Second, the water-NG interface located underground at a depth of several tens of meters from the sea level. This measurement operation, which is tedious and costly, may expose employees to accidents and injuries (especially during the winter when injection/withdrawal operations are more frequent).

Referring now to FIG. 2, there is shown pressure differential measurement system installed in a gas well. A first pressure sensor S1 is installed below the water level WL. A second pressure sensor S2 is installed at the top of the well head that is used to calculate pressure differences. This pressure differential measurement system uses of two pressure sensors that increases the measurement errors. Sensor pressure S1 error is caused by the instability of its electronic components in high pressure and high humidity environment.—Sensor pressure S2 error is caused by its location. In order to have a high precision differential pressure, the S2 sensor should be placed near the WL. As discussed previously, the overall relatively large dimensions of the sensor S2 do not allow it to be installed into the reservoir. Besides, the sensitivity of its electronic components of the inside environment of the well cause errors.

A bubbler system is a continuous level measurement system that is capable of monitoring the variation of the interface level without interruption (Thomas A. Huges, 2002). Indirect level measurement is a measurement method that allows the evaluation of hydrostatic pressure, for example, to deduce the water level. According to these definitions, we can conclude that the bubble system is a continuous type of indirect level measurement system. The bubble system is used to measure level and density. It can also be used to identify the interface in an open or pressurized reservoir. It is a practical system for measuring hydrostatic pressure and density in inaccessible areas (D. S. KAYSER et al. 2003). It has been used to measure the interface level in a nuclear power plant that contains very acidic or alkaline liquids, which can have very high temperature and pressure (Technical Training Gr, 2003).

The operating principle of a conventional bubble system is similar to blowing air into a glass of water with a straw, the more water in the glass, the harder to blow (DS KAYSER et al., 2003). The air pressure that must be applied to produce bubbles in the dip is equal to the pressure of the fluid at the end of the measuring tube. The measurement of the water level is equal to the supplied air pressure. In a pressurized reservoir, the water level in a bubble system is calculated with differential pressure calculations, which is the distinction between hydrostatic pressure and surface pressure. If the water level rises, the hydrostatic pressure increases and implies a rise in differential pressure.

There are four different characteristics of a bubble system: pressure, operating temperature, flow rate and power source.

The bubbler system's operating pressure is typically at least 10 psi (69 kPa) higher than the highest pressure measured (Thomas A. Huges, 2002). The operating temperature of the process does not influence the functionality of the measuring equipment if the equipment is placed outside. The flow rate of the gas injected is typically constantly low and relatively constant at about 1 SCFH (500 cm3/min) in order to avoid significant drop in pressure during the measurement (D. S. KAYSER et al. 2003). Air or inert gas can be used as a power source to produce bubbles in the system, although liquids may also be used (D. S. KAYSER et al. 2003).

Referring to FIG. 3, there is shown a known bubbler system installed on a pressurized reservoir (DS KAYSER et al., 2003). The gas supply used in this installation is nitrogen (N2). It is controlled by a pressure regulator (PCV). The pressure regulator keeps the upstream pressure constant and higher than the total pressure measured when the tank is full. Two solenoid valves (SS) are placed next to the pressure regulator to control the two measuring lines. In a pressure vessel, the measurement of the liquid level is a function of the difference between two pressures (hydrostatic pressure and static pressure). In order to maintain a constant pressure difference between the upstream and downstream pressure, a flow controller (dPCV) is placed in each measuring line.

A rotameter (FI) is placed next to each constant differential relay in order to control and measure the flow rate. To read the differential between upstream and downstream pressure, manometer can be used for each pressure or a differential pressure transmitter can be used to read and subtract both pressures.

Disadvantage of conventional bubble system: The major drawback of known bubbler system techniques resides in the lack of precision of the measurements under a high-pressure environment, especially when the interface level is located at a high altitude below the sea level.

The measurement error of a bubble system depends on the instrument's precision, interface level and ambient temperature, and equipment maintenance.

The bubble's system measurement error can be divided into two groups: human measurement error and system measurement error (Robert B. Northrop, 2005). Several factors could cause human measurement error such as: sampling of measurements before the system reaches steady state, error in recording measured data or misuse of measuring instruments. System measurement errors may result from other factors such as: incorrect calibration of the instrument, reading uncertainty due to the presence of random noise or the presence of sensitivity drift. Sensitivity drift is caused by three factors: 1) the use of instruments in non-compliant; 2) temperature ranges and changes in humidity; and instrument wear.

The measurement error increases when there is a pressure drop in the hydrostatic tube, because the pressure measured at the inlet (end connected to the measuring instrument) of the tube will be different from the actual outlet pressure (end in contact with the process) (D. S. KAYSER et al. 2003).

The flow rate of the gas injected into the measuring tube has a considerable influence on the measuring accuracy. In the normal reservoir (operating condition at atmospheric pressure), a low and constant flow rate of about 1 SCFH (500 cm3/min) must be maintained in order to have the minimum pressure drop (D. S. KAYSER et al. 2003). The type of gas injected also influences the measurement error. Indeed, a gas with a high specific weight has a high pressure drop compared to a gas with a low specific weight. The recommended minimum tube diameter is ½ inch. A smaller diameter maximizes the pressure drop. A leak in the assembly also increases the pressure drop, because the flow regulator will compensate the pressure lost due to leaks to balance the pressure at the tube outlet to produce bubbles, so the tube inlet pressure will be wrong, as it contains the outlet pressure value plus the pressure caused by the leak (Technical Training Gr, 2003).

A correction of the pressure drop in the bubble tube may be necessary in situations that require increased accuracy The conventional bubbler system is an effective system for measuring liquid level in inaccessible and hazardous places. However, this known bubbler system has been shown to be accurate in flow ranges well below 1 SCFH (standard cubic feet per minute) and in well-defined reservoirs. The flow of gas blown into the measuring tube greatly influences the measuring accuracy. A low and constant flow rate should be maintained at approximately 1 SCFH (500 cm³/min) to obtain the minimum pressure drop (D. S. KAYSER et al., 2003). In some applications, it is necessary to have a high flow in order to easily release the water in the measuring tube (2.5 SCFH).

A recommended minimum measurement tube diameter is ½ inch. A smaller diameter maximizes the pressure drop. A leak in the assembly also increases the pressure drop. Known bubbler systems use at least two tubes: the dip tube and the measurement tube. The size of these tubes constrains the accessibility to natural gas reservoirs where there is limited access space for example less than ⅜ ich.

The measurement error of known bubblers increases when there is a pressure drop in the system, because the pressure measured at the inlet (tip connected to the measuring instrument) of the tube will be different from the actual pressure of exit (end in contact with the method) (DS KAYSER et al., 2003).

Also know in the art, there are U.S. Pat. No. 3,330,352 (BERNARD), U.S. Pat. No. 4,006,636 (HOLMEN), U.S. Pat. No. 4,984,451 (WILEN), U.S. Pat. No. 5,115,679 (UHLARIK), U.S. Pat. No. 6,799,457 (BOUCHARD) and U.S. Pat. No. 8,340,929 (SMAIDRIS).

In view of the above, there is a need in the field for a system that accurately identifies and estimates the variation of the water-gas interface in an underground reservoir of natural gas with an indirect measurement method.

SUMMARY OF THE INVENTION

In order to address the above and other drawbacks, there is provided a measuring system for determining a position, density and pressure of an underground liquid or gaseous/liquid interface of a gas well or gas reservoir or pressurized tank, comprising: an instrument panel for measuring data parameters of said underground liquid or gaseous/liquid interface or gas reservoir or pressurized tank in real-time; said instrument panel comprising: a fluid input for receiving gas or liquid; a pressure regulator connectable to the fluid input for regulating a pressure of the fluid input to produce a pressure regulated fluid; a hydrostatic tube output operationally connectable to the pressure regulator for injecting a pressure regulated fluid at an inlet pressure into said underground liquid or gas reservoir or pressurized tank; a static tube output operationally connectable to the pressure regulator for injecting a pressure regulated fluid at an outlet pressure into said underground liquid or gas reservoir or pressurized tank; a multivariable transmitter operationally connectable to the hydrostatic tube output and the static tube output for measuring the data parameters; a first flow controller with first rotameter operatively connected to the pressure regulator for regulating a first flow rate of the fluid that is injectable into the static tube output; and a second flow controller with second rotameter operatively connected to the pressure regulator for regulating a second flow rate of the fluid that is injectable into the hydrostatic tube output; a control panel operatively connectable to the instrument panel for collecting the data parameters in real-time from the instrument panel; and a correction algorithm configured to receive the data parameters and to determine the position, density and pressure of the underground liquid or gaseous/liquid interface or gas reservoir or pressurized tank so as to increase measurement accuracy thereof.

In embodiments, there is provided an improvement of a conventional bubble system for liquid depth measurement that is adapted for high pressure and inaccessible environments. A variety of measurements are taken, such as internal process temperature, external temperature, atmospheric pressure, static pressure in the tank, the actual flow rate of the injected gas and the total measured hydrostatic pressure, and then a plurality of real-time measurement correction algorithms are used to allow for the correction of these measurements.

In embodiments, the system comprises three subsystems: an instrument panel for calculating the water level in the gas well based on the taken measurements, a level calculation panel that collects the measurement data from the instrument panel, and a correction algorithm in the programmable logic controller that increases the measurement accuracy to obtain measurements within the required margin of error (for example 10 cm). The algorithm corrects errors related to pressure drop in the hydrostatic tube, the pressure at the level of water from the wellhead measurement.

In embodiments, the bubbler system provides precise measurements of an interface water/gas level located relatively high from sea level (for example between 58.55-60.6 m) under a high-pressure environment (for example operation measurement pressure 87-150 psi).

In embodiments, there is provided a single tube bubbler system to measure a pressurized interface water/gas level located relatively high from sea level (between 58.55-60.6 m) instead of using two measurement tubes as in a conventional bubbler system.

In embodiments, there is provided a bubbler system configured with a real-time algorithm correction of an interface water/gas level measurement. The correction is applied to the differential pressure measurement through the following algorithms: 1) Real-time correction of a surface pressure measurement located relatively high from sea level (for example between 58.55-60.6 m); 2) Real-time correction of a hydrostatic pressure measurement located relatively high from the sea level (for example between 58.55-60.6 m).

In embodiments, the bubbler system includes electronic components that meet the requirement of a hazardous area (Class 1 Division 1, Class 1 Division 2, CSA normalization).

Other objects, advantages and features of the present invention will become more apparent upon reading of the following non-restrictive description of specific embodiments thereof, given by way of examples only with reference to the accompanying drawings.

BRIEF DESCRIPTION OF THE DRAWINGS

FIG. 11 is a graphical representation of water measurement heights, using a measurement system, according to an illustrative embodiment of the present invention.

DETAILED DESCRIPTION

The present invention is illustrated in further details by the following non-limiting examples.

Figure 2:
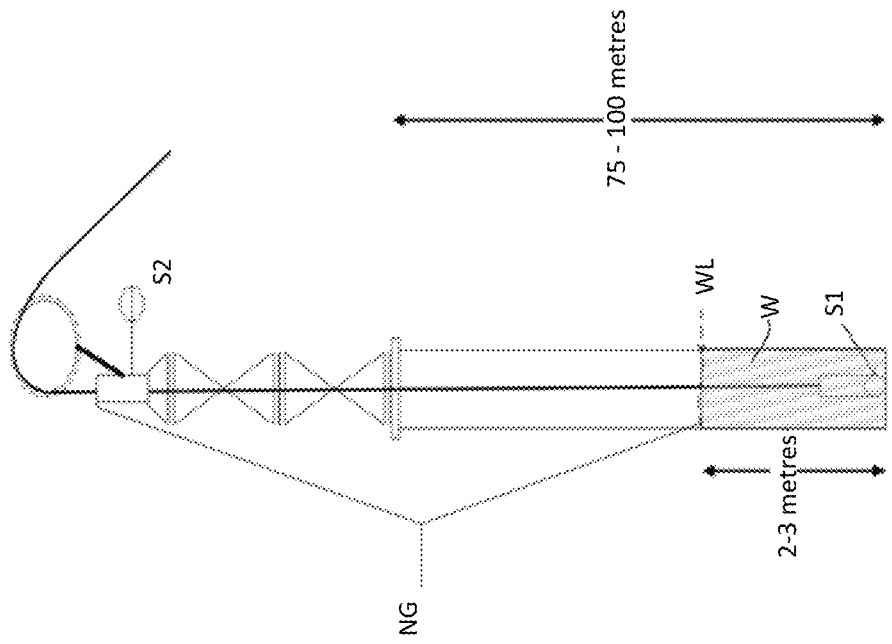
FIG. 2 is a known differential pressure measurement system installed in a gas well.
Figure 1:
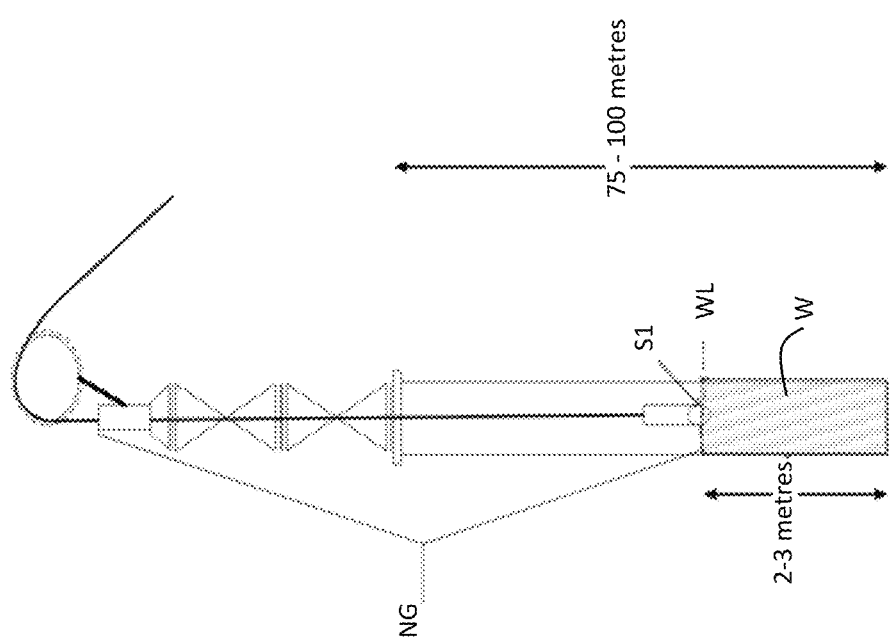
FIG. 1 is a known mechanical float measurement system installed in a gas well.
Figure 3:
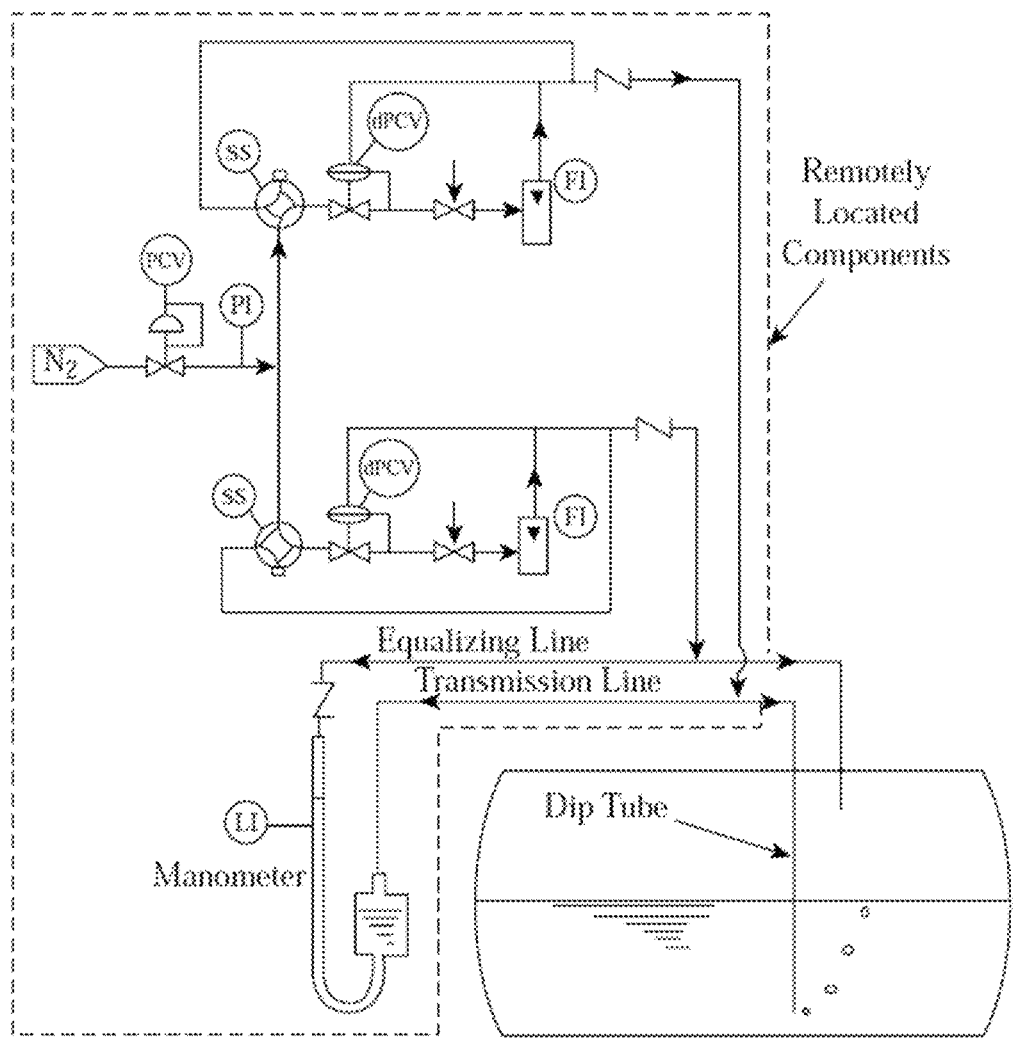
FIG. 3 is a schematic diagram of a known bubbler system.
Figure 4:
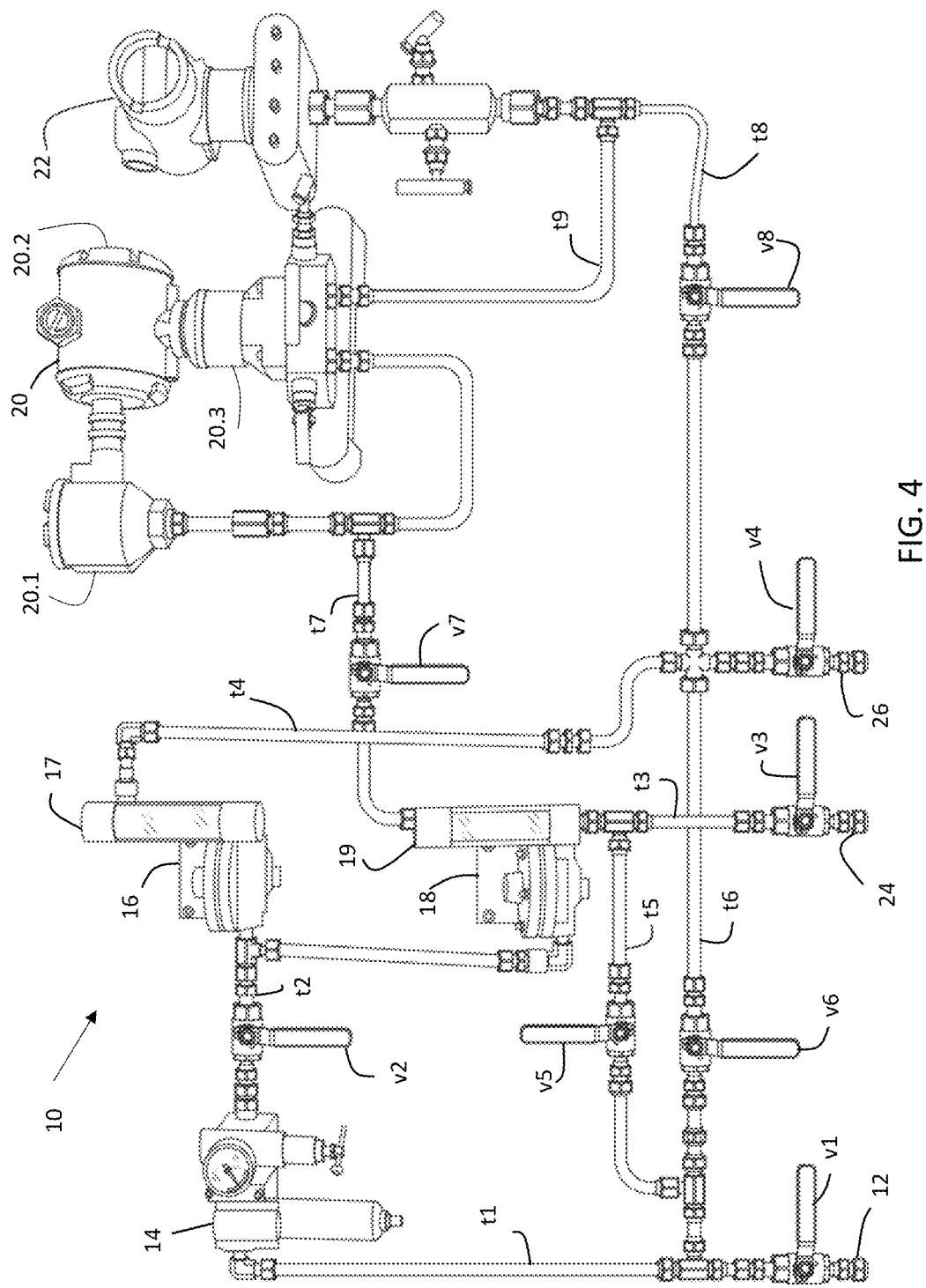
FIG. 4 is front view of an instrument panel of a measurement system, according to an illustrative embodiment of the present invention.

Referring to FIG. 4, there is shown an instrument panel 10 of a first subsystem of a measuring system, according to an illustrative embodiment of the present invention. An objective of the instrument panel 10 is to measure the water level in a gas well in real-time. Real-time is defined as lasting a few microseconds as is well known in the computer science field. In embodiments, the first subsystem is configured to measure the differential pressure, the tank static pressure, the dynamic pressure, the ambient temperature, the gas flow and the tank temperature to derive the water level in the gas well. The instrument panel includes a fluid input 12 (gas or liquid), a pressure regulator 14, a first flow controller 16 with rotameter 17, a second flow controller 18 with rotameter 19, a multivariable transmitter 20, a pressure sensor transmitter 22, a reservoir hydrostatic tube output 24, and a measuring static tube output 26.

Figure 5:
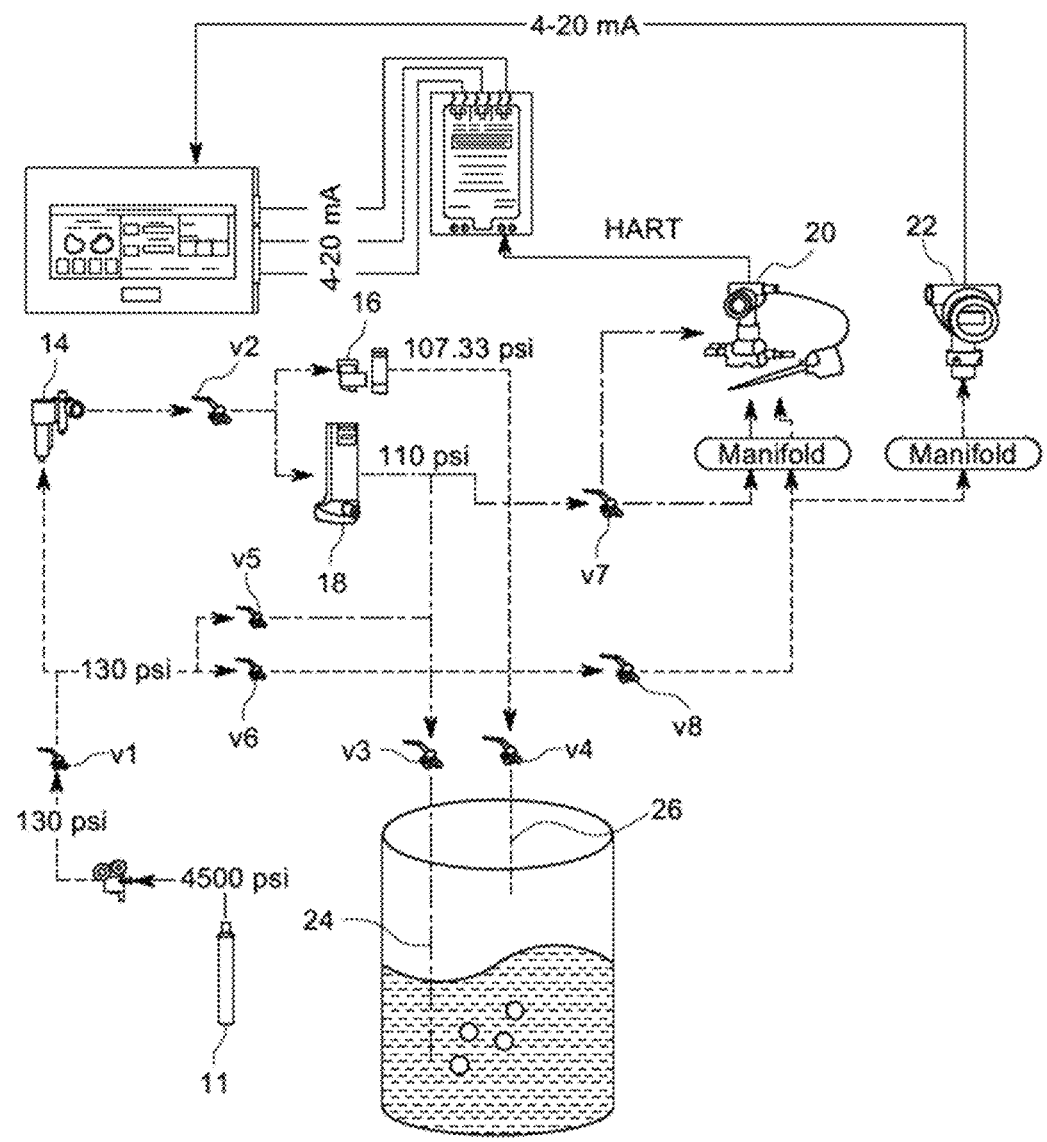
FIG. 5 is a schematic block diagram of a measurement system, according to an illustrative embodiment of the present invention.

Referring now to FIG. 5, in addition to FIG. 4, the fluid input 12 is connectable to the pressure regulator 14 via valve v1 and tube t1 to produce a pressure regulated fluid at valve v2 and tube t2 that is split and injected into both the flow controller 16 with rotameter 17 and the flow controller 18 with rotameter 19. The output of flow controller 18 with rotameter 19 is injected into the hydrostatic tube output 24 via tube t3 and valve v3. The output of flow controller 16 with rotameter 17 is injected into the static tube output 26 via tube t4 and valve v4. An optional purge system connects fluid input 12 to hydrostatic tube output 24 via valve v5 and tube t5, as well as static tube output 26 via valve v6 and tube t6. The flow controller 18 is also connectable to the multivariable transmitter 20 via valve v7 and tube t7. The pressure sensor transmitter 22 is connectable to the static tube output 26 via valve v8 and tube t8. The pressure sensor transmitter 22 is also connectable to the multivariable transmitter 20 via tube t9. The multivariable transmitter 20 may be a known multivariable transmitter such as the 3051S by Rosemount. The multivariable transmitter 20 includes a temperature sensor 20.1, a differential pressure sensor 20.2 for measuring pressure at both input and output (between tube t1 and tube t4 and t8), a hydrostatic pressure sensor 20.3 for measuring hydrostatic pressure (at tube t3 and tube t7), a temperature sensor 20.1 for measuring temperature inside tube t7 and for transmitting a temperature measurement to the temperature sensor 20.2 of the gas injected in the system.

A gas cylinder 11 is preferably used to feed the output tubes 24, 26 of the bubble system. The choice of the gas cylinder depends on the pressure and service life as well as the type of gas. According to the literature review provided above (D. S. KAYSER et al. 2003) [6], the gas cylinder must provide a minimum pressure of 10 psi higher than the maximum measured pressure (maximum hydrostatic pressure plus the maximum internal tank pressure). According to D. S. KAYSER et al., in order to minimize pressure drop, the feed gas flow rate must be set at 1 SCFH (standard cubic feet per hour). The type of gas selected must not change the chemical property of the process in the tank. Therefore, an inert gas will be favorable for the application (example: Nitrogen).

Calculation of the minimum required gas cylinder pressure:

$$P_{min.} = P_{Reservoir\ max.} + P_{Hydro.} + 10\ \text{psi} \quad (4.1)$$

where $P_{min.}$ is the minimum pressure, $P_{hydro}$ is the hydrostatic pressure.

Calculation of the minimum required gas cylinder volume:

$$V_{min.} = Q * F_p * D_m \quad (4.2)$$

where $V_{min.}$ is the minimal volume gas requirement, Q is the gas flow rate, $F_p$ is the sampling frequency and $D_m$ is the measuring time.

In an embodiment, the parameters for calculating the minimum volume of the gas cylinder are 6 months of duration of service, a sampling frequency of 2 times per day, a measuring time of 1 hour, a gas flow rate of 1 SCFH. The minimum pressure required from the gas cylinder to feed the bubble system is calculated 120.45 psi and the minimum volume required for 6 months of service is 360 Cu.ft.

In operation, the pressure regulator 14 reduces the high pressure of the gas cylinder 11 to a working pressure preferably below 1000 kPa. The working pressure is set according to the maximum capacity of the pressure regulator and the purge pressure in the system.

The purpose of the pressure regulator 14 is to set the operating pressure at the inlet of the measuring systems according to its maximum capacity. An air filter may be placed after the pressure regulator 14 to prevent the passage of particles into the system. The pore diameter of the filter membrane is preferably less than 5 microns to prevent clogging of the system tubes.

The flow controller 16 is configured to adjust the gas flow rate through the measuring tube 26 and keep it constant at a set value (2 SCFH: Standard Cubic Feet per Hour). By setting the flow rate in the measuring tubes 24, 26, it is then be easy to measure the pressure variation due to the two following factors: the change in the water level in the reservoir and the static pressure of the well. The operating pressure of the regulator 16 is selected according to the nature of the well. Since the bubble system operates at a high pressure (~761 kPa), the working pressure was selected at 26% (measuring range available in the purchased unit) higher to ensure the regulator's functionality.

The rotameters 17, 19 are placed after the flow controllers 16, 18 to read the gas flow in the measuring tube outputs 24, 26. The gas flow rate in the system is preferably set at 2 SCFH in order to have a minimum pressure drop.

Both measuring hydrostatic and static pressure tubes 24, 26 may be of NPS 3/8, DN 10 type. The length of the hydrostatic pressure tube 24 may be 92 meters. The length of the static pressure tube 26 may be 6 meters. Preferably, only the hydrostatic measuring tube 24 fits in a well. The static pressure tube 26 is used to measure data parameters at the top of the well.

One purpose of a multivariable transmitter 20 operationally connected to the static tube output 26 is to measure the pressure variation in the well. The internal pressure of the well is necessary in order to determine the water level. This information is important in order to know the pressure at the water surface after each injection or withdrawal of gas. The static pressure $P_{static}$ is calculated according to the following formula:

$$P_{static} = P_{well\ head} \times e^{\left[\frac{(\frac{G}{R}) \times L}{T_m}\right]} \quad (4.26)$$

where $P_{well}$ head is the pressure at the well head, G is the specific weight of the gas, R is the constant of the gas, L is the vertical length of the well and $T_m$ is the average temperature of the well.

The pressure range of the static pressure transmitter must be greater than the maximum static well pressure.

$$P_{static\ Max.} > P_{well\ Max.} \quad (4.3)$$

The purpose of a multivariable transmitter 20 is to determine the following variables. Differential pressure: measure the difference between the hydrostatic pressure and the pressure at the surface of the water (reservoir pressure).

Ambient temperature: measure the flow temperature of the fluid. The temperature in this area may vary between −40 and 40° C.

Manometric pressure: measure the total pressure in the bubble tube. The value is used to calculate the pressure drop in the bubble tube and subsequently deduce the actual water body.

Calculation of maximum multivariable transmitter pressure:

$$P_{Differential\ Max.} = P_{Hydro.} = \rho\ g\ h \quad (4.4)$$

where ρ is the density, g is the normal gravity acceleration, h is the water level height.

Density can be determined with (4.4) formula, in this case we can only determine density or position, it is depend of which dynamic an constant variable we have. For example, if we have the density variable ρ is constant so the measuring system will compute the level (position) h and vice versa.

The maximum variation of the water body in the well may be 2.05 meters.

Valve collectors are installed directly after the multivariable transmitter to protect the diaphragm of the transmitter during operation of the system.

The purpose of a purge line is to purge the gas flow line (bubble tube and internal pressure measurement sampling tube). The purging operation is carried out by sending the gas at a maximum pressure (1000 kPa) into the ends of the two measuring tubes in order to release the trapped particles. To protect the measuring instruments (Multivariable transmitter, static pressure transmitter), the shut-off valves must be completely closed during the purging operation.

Isolation valves v1 to v8 allow the closing of the measuring system or the isolation of the pneumatic circuit in order to maintain or replace any equipment.

Casing protects the equipment from wear and tear due to the external environment. The type of casing used is preferably a NEMA-4X. The NEMA 4X casing is primarily designed for outdoor use and offers a superior level of protection against corrosion and extreme environments.

In a preferred embodiment, the bubbler system includes the pressure regulator 14, two constant differential pressure flow controllers 16, 18, two rotameters 17, 19, one static pressure transmitter 22, one multivariable transmitter 20, one static pressure variation measuring circuit, one differential pressure variation measuring circuit and two purge circuits. The measuring instruments (TMV and TS) comply with the standards for a Class 1, Division 1 explosive environment.

Figure 7:
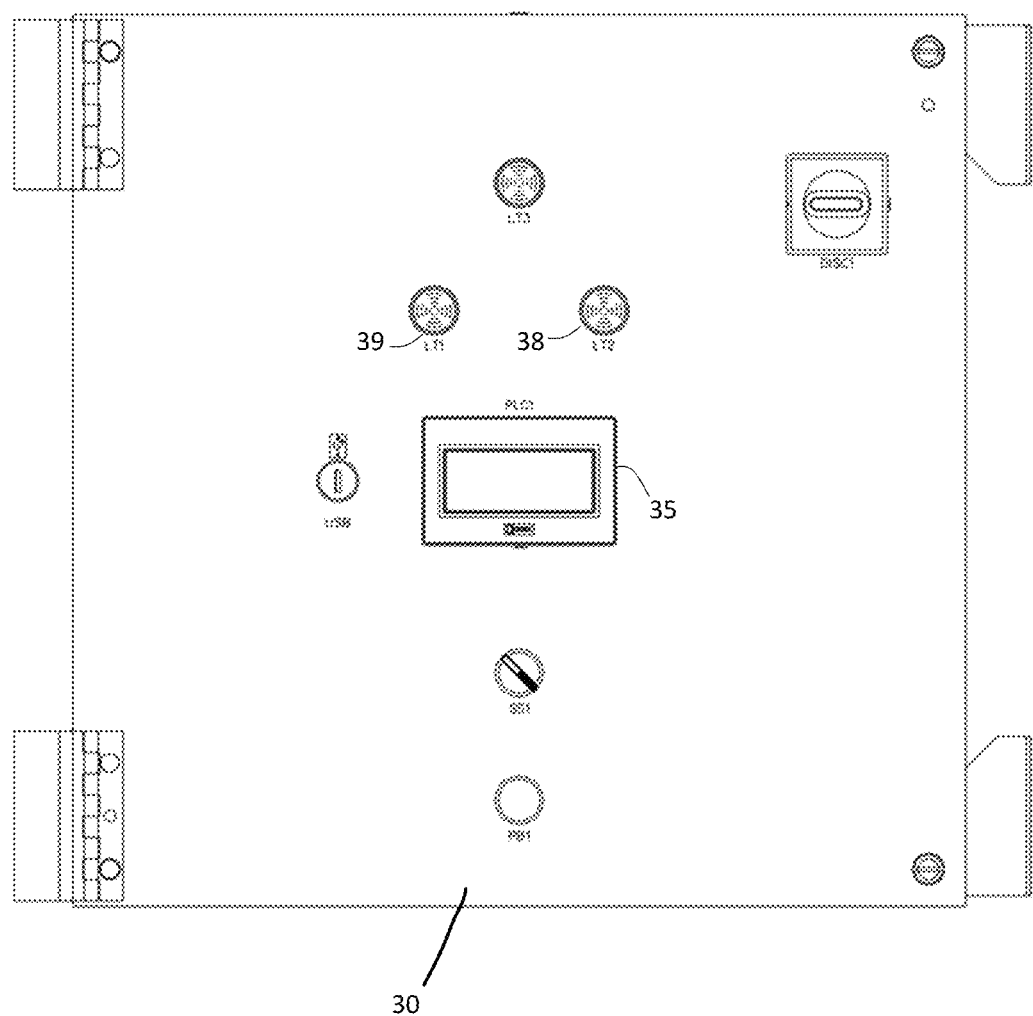
FIG. 7 is a front view of a level calculation control panel of a second subsystem for collecting the instrument panel measurement data, according to an illustrative embodiment of the present invention.
Figure 8:
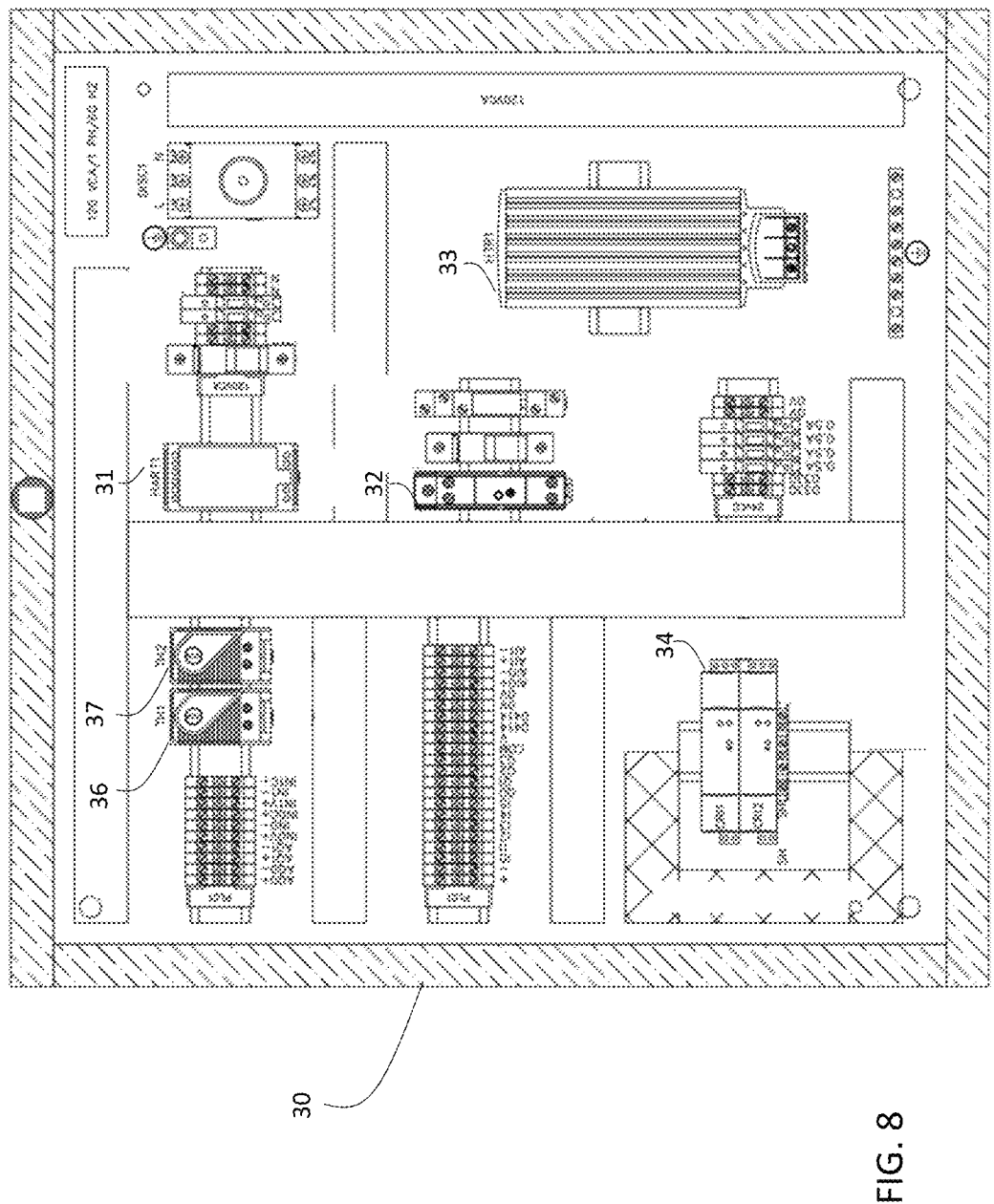
FIG. 8 is a front view of an inside of a level calculation control panel of a second subsystem for collecting the instrument panel measurement data, according to an illustrative embodiment of the present invention.

Referring to FIGS. 7 and 8 there is shown a level calculation control panel 30 of a second subsystem for collecting the instrument panel measurement data, according to an illustrative embodiment of the present invention. The control panel 30 contains a highway addressable remote transducer (HART) 31, instrument power 32, a heating element 33, a galvanic isolation system 34, a programmable controller for final data collection, and a user interface 35 to interact with each other and with the measuring instruments. The control panel 30 has been certified to comply with the standards and requirements of the gas industry The purpose of the control panel 30 is to supply, read and correct the data from the measuring equipment (TMV and TS).

In order to protect the instruments that are located in the explosive zone, we have placed two intrinsic barriers 34 in the system. The purpose of these barriers is to limit the current and voltage in the intrinsically safe circuit when the voltage from the unsafe area becomes too high, or when a short circuit occurs in the intrinsically safe part.

The purpose of the HART 31 converter is to convert the HART signal of the Multivariable Transmitter 20 into three analog 4-20 mA signals (differential pressure, gauge pressure and temperature).

In order to keep the operating temperature of the electrical equipment at a minimum of 15° C., two thermostats 36, 37 are installed to control the temperature inside the control panel 30. Both thermostats 36, 37 are connected to the heating element 33. If the temperature inside the panel is below 15° C. during the winter period, the TH1 thermostat 36 activates the heating element 33. The second thermostat (TH2) 37 limits the heating temperature to 17° C.

The purpose of the PLC 35 is to read the information sent by the measuring instruments, make pressure drop corrections, correct the differential pressure and the static pressure of the tank, deduct the water level, record the corrected data and send the corrected values to a user interface 35. The user interface 35 is designed to display the corrected final measurement data, the raw measurement values and the operating instructions for the system. Choosing PLC 35 as the calculation and control unit was based on the industrial nature of the application. The inputs/outputs of the PLC 35 will be discussed in detail blow.

The PLC 35 has 4 analog inputs (the analog variables are differential pressure, base temperature, static pressure and internal tank pressure).

The application requires only 2 digital outputs. The first one LT1 38 is to supply the green commissioning light of the panel 30. The red light LT2 39 is to signal an anomaly in the system.

Figure 6:
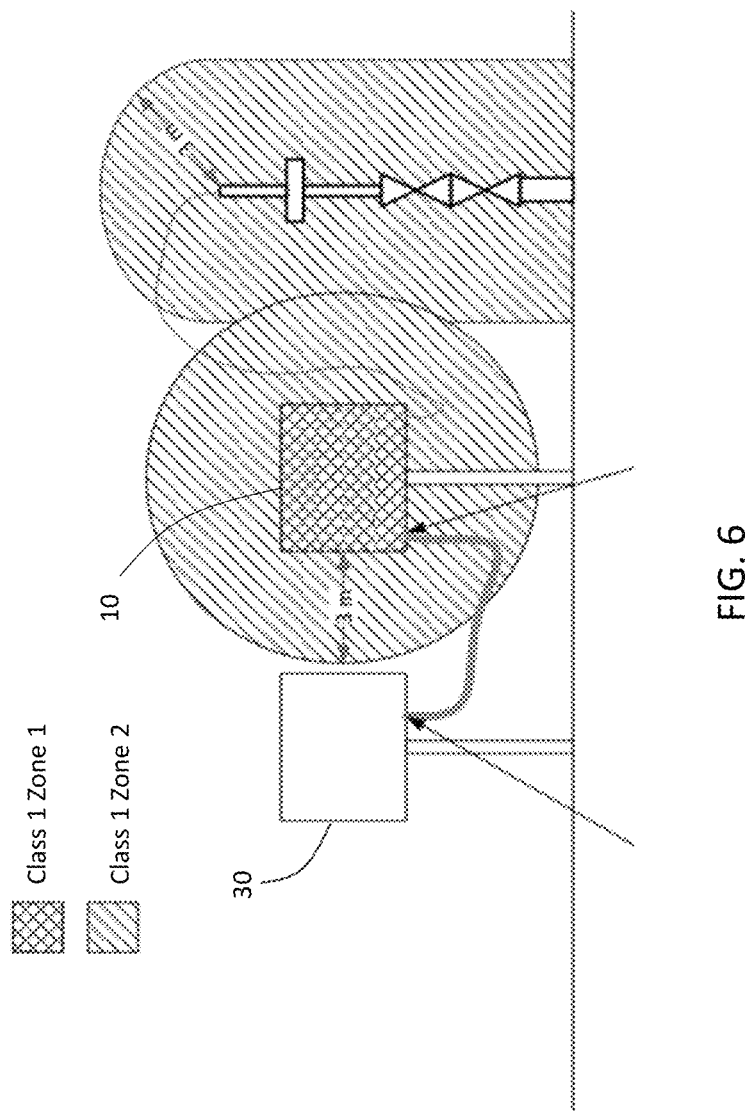
FIG. 6 is a schematic diagram of a measurement system, according to an illustrative embodiment of the present invention.

Referring to FIG. 6, the classification around a well (in the open air) is generally 3 meters, within which a Class 1 Division 2 is designated. Therefore, all electrical equipment installed within the 3-metre perimeter has a CSA certification. On the other hand, some equipment is installed inside a instruments panel s where the gas manifold inside. In this case, the electrical equipment are certified Class 1 Division 1. For electrical connectors, ST series connectors are used for unclassified areas and STX series for classified areas. In summary, all connectors located in or connected to the instrument panel must be STX type. The connectors on the cables connected to the power panel are of type ST. See the appendix section for classifications.

In order to test the two panels (instrumentation and control panel) in the laboratory with a similar environment to the installation site, a test tank was designed. Its purpose is to simulate the same well conditions as those at the installation site. The objective is to simulate the hydrostatic pressure variation and the static pressure inside in real time before implementing it in a well on site, such as one indicated in the above background of the invention. The established methodology was as follows: a design of the reservoir was made by a 3D design software and its capacity (maximum pressure) was calculated with a numerical analysis by the finite element method (FEM). The maximum allowable working pressure of the test tank can reach 8273 kPa (the maximum pressure in the real reservoir doesn't exceed 750 kPa).

Figure 9:
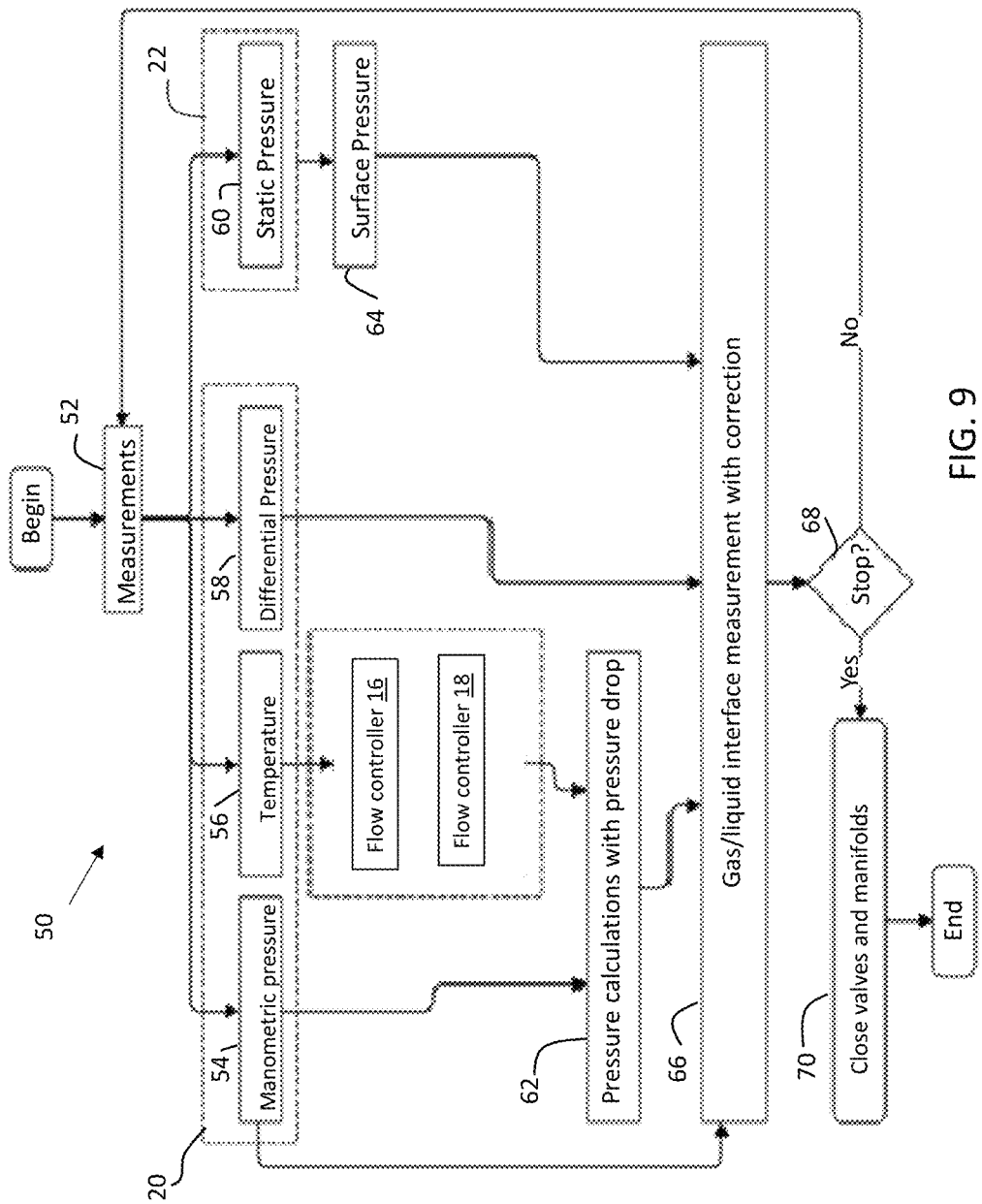
FIG. 9 is a block diagram of a correction algorithm of a measurement system, in accordance with an illustrative embodiment of the present invention.
Figure 10:
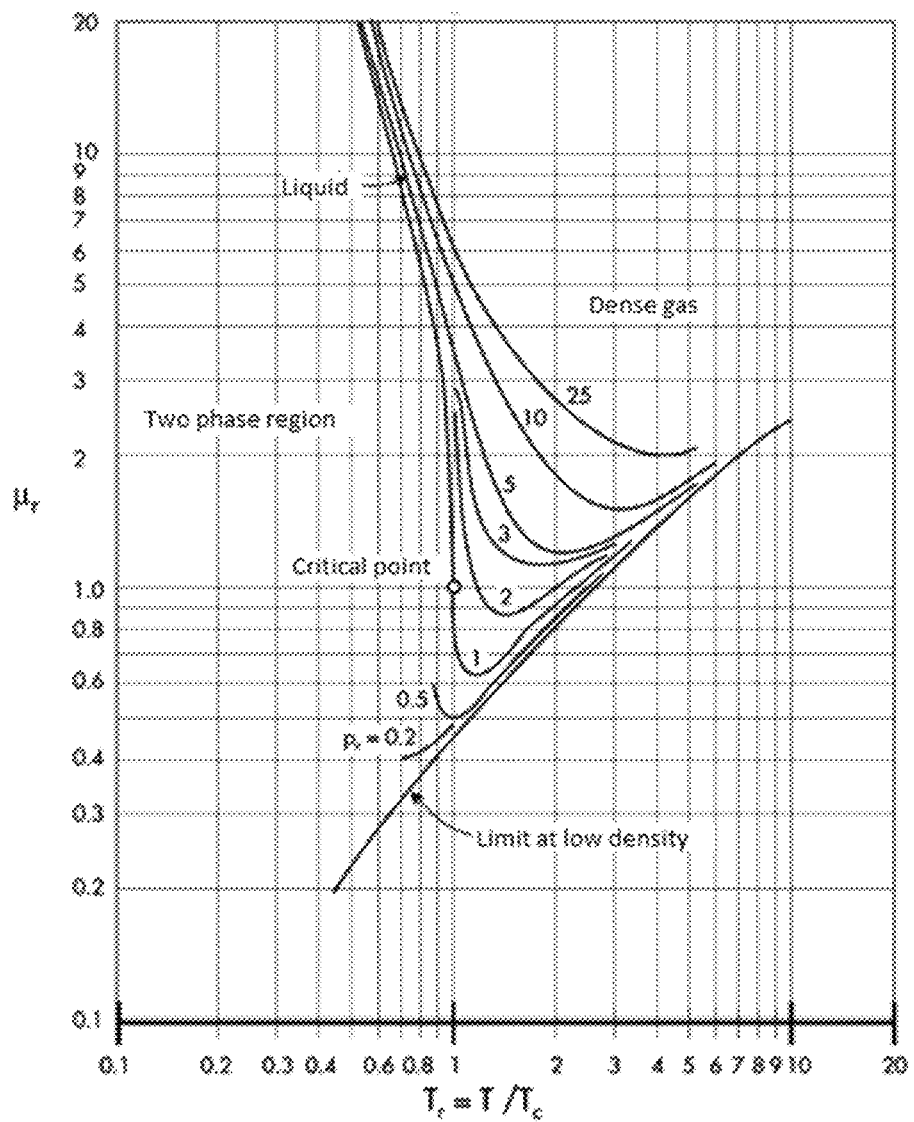
FIG. 10 is a graphical representation of different parameters of liquid, gas and a two phase region, according to according to an illustrative embodiment of the present invention.

Referring now to FIG. 9 in addition to FIGS. 4 and 5, a correction algorithm of a third subsystem of the measurement system is used for increasing the measurement accuracy and obtain measurements within a preferred margin of error (10 cm), according to an illustrative embodiment of the present invention. The correction algorithm has been implemented in the PLC for allowing corrections to the pressure drop, the static pressure at the wellhead and the actual flow rate of injected gas. As persons skilled in the art will understand, the correction algorithm may generally be embodied in a computer memory having stored thereon a computer program containing instructions to carry out the steps of the correction algorithm.

The algorithm 50 begins by receiving measurement data 52 from the multivariable transmitter 20 including manometric pressure measurements 54, temperature measurements 56, differential pressure measurements 58; and static pressure 60 from pressure sensor transmitter 22. The flow controller 18 receives the temperature measurements 54 and is used to calculate the flow in SCFH, then the speed in m/s and then the flow in m3/day. The algorithm calculates at 62 the pressure at the output of the bubble tube 24 with load losses from the manometric pressure measurements 54 and the flow m3/day from the flow regulator 18. The static pressure transmitter 22 measure the static pressure 60 which allows to calculate the surface liquid surface pressure 64. The algorithm then measures the liquid/gas interface with corrections at 66 based on the manometric pressure 54, the calculated pressure 62, the differential pressure measurements 58 and the calculated liquid surface pressure 64. The algorithm then continues with the measurements at step 68 or closes the valves and manifolds of the instrument panel 10 at step 70.

A general flow formula is used to compute the pressure drop in the hydrostatic tube. The formula that is used makes it possible to identify the total pressure drop in the hydrostatic tube by taking into account several factors, which are identified below.

It is assumed: a steady-state flow; One-dimensional flow: Very low fluid viscosity. The physical parameters of the fluid depend on the curvilinear abscissa of the average line; The compressibility effect is omitted if the Mach number is less than 0.2; Isothermal flow: it is assumed that the temperature inside the reservoir is constant at 10° C. (the temperature variation in the first 10 meters of soil is not considered); the effect of kinetic energy is not considered: Kinetic energy is disregarded because the speed of sound is low and the fluid mass is negligible; Omitted Potential Energy: For gas flow, the potential energy variation is almost equal to 0; The behavior of the gas is perfect: reduced temperature higher than 2, reduced pressure lower than 1; The compressibility Z factor of the gases is the same as a perfect gas Z≈1: the compressibility factor was calculated by the CNGA method (California Natural Gas Association Method), for pressures below 750 kPa. Z is approximately equal to 1; The length of the tube studied under isothermal conditions is 92 m.; The cross section of the tube is constant; The efficiency coefficient of the tube is equal to 1; The internal roughness effect of the tube is disregarded: the internal roughness of the tube is low (smooth tube).

The general flow formula, also called the Fundamental Flow formula, relates the pressure drop to the volume flow. It takes into account the coefficient of pressure drop. It is used to calculate the pressure drop or the volume flow rate of the isothermal flow of a compressible fluid in a circular pipe.

$$Q = 5.747 \times 10^{-4} F \left(\frac{T_b}{P_b}\right) \left[\frac{P_1^2 - P_2^2}{GT_f LZ}\right]^{1/2} D^{5/2} \quad (4.5)$$

where $P_b$ is the base pressure, $T_b$ is the base temperature, L is the length of the bubble tube 24, D is the inlet diameter of the hydrostatic tube 24, $T_f$ is the process temperature, G is the specific weight of the gas, Z is the compressibility factor of the gases and $P_1^2 - P_2^2$ is the differential pressure between the inlet and outlet of the hydrostatic tube 24.

The F transmission factor is considered to be the opposite of the f friction factor. While the friction factor indicates how difficult it is to move a certain amount of gas, the transmission factor is a direct measure of the amount of gas that can be moved. As the friction factor increases, the transmission factor decreases and, as a result, the gas flow rate decreases as well. Conversely, the higher the transmission factor, the lower the friction factor and, therefore, the lower the flow rate.

The F transmission factor is related to the f friction factor as follows:

$$F = \frac{2}{\sqrt{f}} \quad (4.6)$$

The gas flow velocity represents the flow velocity of the gas molecules from one point to another. The expression of the flow velocity of a compressible fluid accounts for the temperature variation, the pressure in the tube and the compressibility factor.

$$V = 14.7349 \left(\frac{Q}{D^2}\right)\left(\frac{P_b}{T_b}\right)\left(\frac{ZT}{p}\right) \quad (4.7)$$

where Q is the flow of the gas, D is the diameter of hydrostatic tube, $P_b$ is the base pressure, $T_b$ is the base temperature, Z is the compressibility factor, T is the process temperature, P absolute pressure.

The Reynolds number is used to characterize the type of flow and calculate the pressure drop. In a gas pipeline, the following formula is used:

$$R_e = 0.5134 \left(\frac{P_b}{T_b}\right)\left(\frac{GQ}{\mu D}\right) \quad (4.8)$$

where $\mu$ is the dynamic viscosity

Note that the Reynolds number in this section is expressed in terms of gas flow per day. Formula above can be used for natural gas pipeline calculations.

The pressure drop coefficient is used to calculate the pressure drop in a pipe. It varies according to the type of flow. In the case of laminar flow (Res≤2000), the following expression is used:

Pressure Drop Coefficient $$f = \frac{64}{R_e} \quad (4.10)$$

In the case of turbulent flow (Re≥4000), the following COLEBROOK-WHITE formula is used:

$$\frac{1}{\sqrt{f}} = -2\log_{10}\left(\frac{e}{3.7D} + \frac{2.51}{R_e\sqrt{f}}\right) \quad (4.11)$$

If we disregard the roughness of the inner surface of the tube, we obtain the following formula:

$$\frac{1}{\sqrt{f}} = -2\log_{10}\left(\frac{2.51}{R_e\sqrt{f}}\right) \quad (4.12)$$

The critical viscosity can be estimated using the following correlation:

$$\mu_c = 7.7 \; 10^{-7}(M)^{1/2}(P_c 10^{-5})^{2/3} T_c^{-1/6} \quad (4.13)$$

The temperature of a substance is considered to be high when compared to its critical temperature.

$$Tr = \frac{T}{Tcr} \quad (4.14)$$

The formula for the state of a perfect gas accurately describes the behavior of the real gas at low pressure and high temperature. The pressure of a gas is considered to be low when compared to its critical pressure.

$$Pr = \frac{p}{Pcr} \quad (4.15)$$

Reduced viscosity is the ratio of dynamic viscosity and critical point viscosity at a given temperature and pressure.

$$\mu_r = \frac{\mu}{\mu_c} \quad (4.16)$$

The measurement of the pressure at the water surface in the well is taken at the wellhead by the static pressure transmitter 22. The well's configuration does not allow two measuring tubes to be introduced in order to take the hydrostatic pressure and the surface pressure of the water in order to deduce the measurement of the water interface. Therefore, the calculation of the pressure at the water surface will be approximated with the following formula:

$$P_{static} = P_{well\;head} \times e^{\left[\frac{\left(\frac{G}{R}\right) \times L}{T_m}\right]} \quad (4.26)$$

The measurement of the water interface in the well is completed using the differential pressure measurement completed with the multivariable transmitter 20 and deduced with the hydrostatic pressure formula:

$$P_{Differential\;Max.} = P_{Hydro.} = \rho \; g \; h \quad (4.4)$$

The effects of pressure drop and pressure measurements at the water surface are accounted for in formula below. We will calculate the linear pressure drop of hydrostatic tube and the pressure at the water surface using formulas:

$$Q = 5.747 \times 10^{-4} F \left(\frac{T_b}{p_b}\right) \left[\frac{(p_1^2 - p_2^2)}{GT_f LZ}\right]^{1/2} D^{5/2} \quad (4.5)$$

$$P_{static} = P_{well\;head} \times e^{\left[\frac{\left(\frac{G}{R}\right) \times L}{T_m}\right]} \quad (4.26)$$

then subtract the calculated value (measurement correction) from the measured pressure difference, then, the hydrostatic pressure formula is used to obtain the level water.

$$h = \frac{\Delta p_{measured} - \left[(p_1 - p_2) + p_{measured\;well\;head} \times \left[e^{\left[\frac{\left(\frac{G}{R}\right) \times L}{T_m}\right]} - 1\right]\right]}{\rho \; g} \quad (4.27)$$

Analytical calculations were used to illustrate the impacts of the linear pressure drop of hydrostatic tube on the water level measurement. In order to obtain the impact of the pressure on the measurement of the level, without the effect of ambient temperature variation due to the reservoir's temperature, the ambient temperature has been equalized to the tank's internal temperature (10° C.). The calculation data is shown in Table 5.1.

TABLE 5.1

| Parameters | Values |
| --- | --- |
| Base temperature | 10° C. |
| Reservoir temperature | 10° C. |
| Atmospheric pressure | 101.3 Pa |
| Gravity acceleration g | 9.81 m/s² |

TABLE 5.1-continued

| Parameters | Values |
| --- | --- |
| Length of tube | 92.426 m |
| Speed of flow | 1 m/s |
| Inside tube diameter | 7.747 mm |
| Efficiency facto of tube | 1 |
| Compressibility factor | 1 |

The gas used (Nitrogen N2) similar to the gas supply during the level measurement. The properties of Nitrogen are set out in Table 5.2.

TABLE 5.2

| | Molar mass | Gas constant | Critical temperature | Critical pressure | Specific weight | Cp/Cv |
| --- | --- | --- | --- | --- | --- | --- |
| N2 | 28.013 kg/Kmol | 0.2968 kJ/kg k | 126.2 K | 3390 Pa | 0.9672 G | 1.4030 |

Calculation of the impact of pressure drop on measurement of the levels using the general flow formula:

$$P_1^2 - P_2^2 = \left[\frac{Q\, P_b}{5.747\ 10^{-4}\ F\ T_b D^{8/2}}\right]^2 \times (G\, T_f\, L\, Z) \quad (5.1)$$

The formula above, shown that the pressure drop depends on several factors.

The pressure drop will increase under the following conditions: a high pressure service, if the supply gas has a high specific weight. For example: the pressure drop of Nitrogen is higher than the pressure drop of methane, because Nitrogen has a specific weight that is twice the weight of methane. The pressure drop increase when the length of pipe increase and the diameter decrease. Therefore, the correction of the linear pressure drop of hydrostatic tube is taken into consideration for the following reasons: the long measuring tube length (92,426 m), the small diameter of the measuring tube (7,747 mm), the high operating pressure of the measuring well [340 kPa, 750 kPa] and the Nitrogen gas used as a supply.

The pressure drop value increases in proportion to the tank pressure value as shown In table 5.3, which describes the pressure drop values related to the minimum and maximum reservoir pressure values.

$$\text{Measurement error} = \frac{p_1^2 - p_2^2}{p\, g} \quad (5.2)$$

If we calculate the measurement error resulting only from the pressure drop, using formula 5.2. we notice that the measurement error increases with increasing of the pressure drop.

The maximum and minimum measurement error derived from Table 5.3 using formula 5.2 is presented in Table 5.4.

TABLE 5.3

| Parameters | Values |
| --- | --- |
| Pressure drop at 340 kPa | 0.779 kPa |
| Pressure drop at 750 kPa | 1.293 kPa |

TABLE 5.4

| Parameters | Values |
| --- | --- |
| Measurement error at 340 kPa | 7.94 cm |
| Measurement error at 750 kPa | 13.19 cm |

Effect of Ambient Temperature Variation on Measurement

We now assess the impact on the pressure drop of temperature variations at the inlet and outlet of the hydrostatic tube, using the general flow method described above. Calculations of the impact of ambient temperature have been performed using the general flow formula.

The reservoir temperature (outlet temperature of the hydrostatic tube) at 92,426 m were set at 300 kPa and 10° C. Only the ambient temperature was modified in order to study the pressure drop resulting from it.

Changes in ambient temperature considerably impact the measurement error. This is especially noticeable in the negative temperature range, because the deviation from the process temperature in the negative range is higher than in the positive range. The measurement errors due to the variation of the ambient temperature in relation to the internal temperature of the reservoir are shown in table 5.10.

TABLE 5.10

| Parameters | Values |
| --- | --- |
| Measurement error at 31° C. | 0.944 cm |
| Measurement error at −30° C. | 2.635 cm |

Gas is a compressible fluid. Its density changes according to temperature, inlet and outlet pressure. When the flow temperature of the gas at the inlet of the tube is at −30° C. (maximum error), the density of the supply gas increases and as a result, the energy loss in the system will be at a maximum.

In conclusion, the measurement error in the bubble tube resulting from the linear pressure drop in hydrostatic tube will be very significant at a high pressure of 750 kPa and a high negative temperature of −30° C. On the other hand, this error will be small at low pressure 340 kPa and high positive temperature+30° C.

Impact of Static Pressure Measurement on Interface Measurement

If we calculate the measurement error only from static pressure, we obtain a linear increase in values by using formula 4.26. The measurement error increases with the static pressure as well as the height situated between the measurement point and the water surface. The greater the distance between the measuring point and the water surface, the greater the pressure difference between the two points. The maximum and minimum measurement error that is inferred is shown in Table 5.11 below.

TABLE 5.11

| Parameters | Values |
| --- | --- |
| Measurement error at 340 kPa | 26.14 cm |
| Measurement error at 750 kPa | 50.61 cm |

Pressure at the surface of the water level is always higher than the pressure at the head of the reservoir due to the weight of the gas inside. This weight is considerable when the measuring plane is located at a height of 92,426 m above sea level. As experimented, the pressure difference between the head of the well and the surface measure plane is linear. It increases along with the increase of the pressure of gas storage inside the reservoir and the height between the measuring point and the surface measure plane. Therefore, the measuring error increase when the internal pressure of the reservoir is at the maximum.

Measuring Accuracy of the Measuring System

The measuring accuracy of each measuring instrument is set out in Table 5.12.

TABLE 5.12

| Measurement instrument | Reading error |
| --- | --- |
| Multivariable transmitter | ±0.04% |
| Pressure transmitter | ±0.04%. |
| Flow regulator of hydrostatic tube | ±5% |
| HART converter | ±0.15% |

All measuring instruments have been calibrated to the tank's measuring ranges. In order to calculate the accuracy of the measuring systems, the values provided for in Table 5.12 and formulas 5.1 and 4.27 were used. The percentage accuracy of each element in our interface calculations is expressed in Table 5.13 below.

TABLE 5.13

| Equations | Reading error |
| --- | --- |
| Pressure drop | [0.174% 0.181%] |
| Static pressure | $+1.3310^{-4}$ |
| Measured differential pressure | ±0.19% |
| Measured interface | [−0.364% 0.009%] |

In embodiments, innovative aspects that distinguish the present invention from common bubble systems are the corrections of measurements taken in an inaccessible environment at high pressure in real time via advanced and safe instrumentation. To adapt the measurement system to high pressure and inaccessible environments, several technical improvements have been made, such as the addition of a multivariable pressure transmitter and real-time measurement correction algorithms that allow correction of the level of an interface and the static pressure while taking into account the effect of the internal process temperature, the external temperature, the atmospheric pressure, the static pressure in the tank, the actual flow rate of the injected gas and the total measured hydrostatic pressure. The accuracy is thus improved.

An embodiment of the present system was installed in the B-280 well at the Lac Trois-Rivières site, where there is a B-81 measurement validation well. The measurement validation well makes it possible to validate the measurement taken with the bubble system. Unlike the designed system, measurement in the measurement validation well is manually taken using a probe. It consists of a counterweight suspended at the end of a cable. An engine allows unrolling the rope until the counterweight comes in contact with the water. At this time, the tension of the cable is released actuating a switch whose role is to reverse the direction of rotation of the motor. The length of the unrolled cord is measured when the float (weight attached to the rope) touches the water.

The measuring system designed in this project replaces the direct measurement system performed by the probe. However, the only method to verify the measurement accuracy of the bubble system is to measure the level in a measurement validation well with a direct measuring instrument (probe).

Results of the New System (Measurements)

Referring to FIG. 11, there is shown a graphical representation of the water measurement heights with respect to the dates at the B-280 well and the B-81 measurement validation well. There are shown the measurements of the water body with the present measuring system and the measurement of the water of the measurement validation well. There is also shown the measurement of the water without correction taken with the present system.

Referring to Tables 5.12 and 5.16, there is illustrated the difference values between the water interface measured with the new system and the measurement validation well. Measurements without correction of the new measurement system are the measurement without the application of pressure drop correction algorithms or the algorithm for the correction of the static pressure. Measurements with correction are the measurements with the application of the correction algorithms explained at the beginning of the section.

According to the recorded measurement history (measurements taken since July 2018), the measurement deviation with the bubble system without the correction algorithms is very high. It can reach 85.017 cm.

TABLE 5.12

Measurement gap without correction between wells B-280/B-81

| Difference | Values |
| --- | --- |
| Average | −67.15 cm |
| Minimum | −50.05 cm |
| Maximum | −85.017 cm |

In Table 5.16, one demonstrates the measures of the system after the application of the correction algorithms. As explained at the beginning of the section, the correction algorithms compensate for several errors: the measurement error of the static pressure, the gas pressure to produce bubbles as well as the effect of variation of the gas temperature to inlet and outlet of the tank.

TABLE 5.16

Measurement gap with correction between wells B-280/B-81

| Difference | Values |
| --- | --- |
| Average | 4.09 cm |
| Minimum | −0.38 cm |
| Maximum | −11.83 cm |

The values presented in Table 5.16 are the same data values of the measurements made with the improved system presented in Table 5.12. At these values, one applied the correction algorithms.

The percentage difference between the estimated average error by applying the correction algorithms and without the application of the correction algorithms is 684.96%. If one looks at FIG. 11, one notices that the measurements of the water with correction almost correspond to the measurements of the measurement validation well. Unlike measurements with the same system without correction of static pressure, pressure drop and temperature variation. The estimated average error value obtained includes the error due to the inaccuracy of full-scale instrument shown.

According to the result of experimental measurements, the implanted correction algorithms significantly improved the measurement error by 684.96%. In general, the conventional bubble system is simple to use. It is capable of measuring the interface with a measurement error between ±0.05% and ±2.0% (William C. Dunn, 2005) only in low service pressures and a short measurement height. Complex geometry tanks (e.g. gas fields), high service pressure, high measured interface position and tank volume make the use of the bubble system more complex. The improved system with real-time correction algorithms provides an estimated average error of 8.05 cm maximum.

The scope of the claims should not be limited by the preferred embodiments set forth in the examples, but should be given the broadest interpretation consistent with the description as a whole.

REFERENCES

Khamehchi E., Hamidreza S. Y. and Sanaei A. Selection of the Best Efficient Method for Natural Gas Storage at High Capacities Using TOPSIS Method, Gas Processing Journal vol. 1, no. 1, pp. 9-18, January 2013.

Thomas A. Huges, Measurement and Control Basics, 3rd Edition, ISA Press, 147-169, 2002.

D. S. Kayser, B. G. Liptak, C. G. Langfor, Bubblers, Instrument Engineers Handbook Fourth Edition Volume One Process Measurement and Analysis, pp. 421-429, 2003.

Technical Training Group, Science Reactor Fundamentals, *Instrumentation & Control*, 2003.

Thomas A. Huges, Measurement and Control Basics, 3rd Edition, ISA Press, 147-169, 2002.

W. Boyes, *Instrument Reference Book-Measurement of Level and Volume*, Fourth Edition. Elsevier, 103-112, 2010.

William C. Dunn, Fundamentals of industrial instrumentation and process control, McGraw-Hill, 86-98, 2005.

Robert B. Northrop, *Introduction to Instrumentation and Measurements*, Second Edition, 7-13, 2005.

The invention claimed is:

1. A measuring system for determining a position or a height (h), a density (ρ) and a pressure of an underground liquid or a gaseous/liquid interface of a gas well or a gas reservoir or a pressurized tank, comprising:
    an instrument panel (10) for measuring data parameters of said underground liquid or said gaseous/liquid interface or said gas reservoir or said pressurized tank in real-time;
    said instrument panel (10) comprising:
        a fluid input (12) for receiving gas or liquid;
        a pressure regulator (14) connectable to the fluid input (12) for regulating a pressure of the fluid input (12) to produce a pressure regulated fluid;
        a hydrostatic tube output (24) operationally connectable to the pressure regulator (14) for injecting an inlet pressure regulated fluid at an inlet pressure ($P_1$) into said underground liquid or said gas reservoir or said pressurized tank;
        a static tube output (26) operationally connectable to the pressure regulator (14) for injecting an outlet pressure regulated fluid at an outlet pressure ($P_2$) into said underground liquid or said gas reservoir or said pressurized tank;
        a multivariable transmitter (20) operationally connectable to the hydrostatic tube output (24) and the static tube output (26) for measuring the data parameters;
        a first flow controller (16) with a first rotameter (17) operatively connected to the pressure regulator (14) for regulating a first flow rate of the fluid that is injectable into the static tube output (26); and
        a second flow controller (18) with a second rotameter (19) operatively connected to the pressure regulator (14) for regulating a second flow rate of the fluid that is injectable into the hydrostatic tube output (24);
    a control panel (30) operatively connectable to the instrument panel (10) for collecting the data parameters in real-time from the instrument panel (10); and
    a correction algorithm configured to receive the data parameters and to determine the position, the density and the pressure of the underground liquid or the gaseous/liquid interface or the gas reservoir or the pressurized tank so as to increase measurement accuracy thereof.

2. The system of claim 1, wherein the hydrostatic tube output (24) is configured to inject said inlet pressure regulated fluid below the gaseous/liquid interface of the gas well, and the static tube output (26) is configured to measure the data parameters at a top of the gas well.

3. The system of claim 2, wherein a single measuring tube is configured to fit into an opening of the gas well, said measuring tube comprising said hydrostatic tube output (24).

4. The system of claim 2, wherein the gas well includes a high pressure environment ranging from 87 to 150 psi.

5. The system of claim 1, wherein the control panel (30) is located outside a hazardous area associated with the gas well.

6. The system of claim 1, wherein a drop in pressure ($P_1 - P_2$) that is measured via the hydrostatic tube output (24) is determined according to the following formula:

$$P_1^2 - P_2^2 = \left[\frac{Q\, P_b}{5.747\, 10^{-4}\, F\, T_b D^{5/3}}\right]^2 \times (G\, T_f L\, Z)$$

where $P_1$ is the inlet pressure, $P_2$ is the outlet pressure, Q is the flow rate of the gas, $P_b$ is a base pressure, F is the transmission factor, $T_b$ is a process temperature, G is the specific weight of the gas, D is the inlet diameter of the hydrostatic tube output (24), $T_f$ is the temperature of the gas flow, L is the vertical length of the hydrostatic tube output (24), Z is the compression factor.

7. The system of claim 1, wherein a static pressure $P_{static}$ that is measured via the static tube output (26) is determined according to the following formula:

$$P_{static} = P_{well\ head} \times e^{\left[\frac{\left(\frac{G}{R}\right) \times L}{T_m}\right]}$$

wherein $P_{well\ head}$ is the pressure at a well head, G is the specific weight of the gas, R is the constant of the gas, L is the vertical length of the hydrostatic tube output (24), $T_m$ is the average temperature, and wherein a hydrostatic pressure $P_{Hydro}$ that is measured via the hydrostatic tube output (24) is determined according to the following formula:

$$P_{Differential\ Max.} = P_{Hydro.} = \rho\ g\ h$$

wherein ρ is the density of the gas, g is the acceleration constant, and h is the height of the liquid gaseous interface that is calculated by the following formula:

$$h = \frac{\Delta p_{measured} - \left[(P_1 - P_s) + P_{measured\ well\ head} \times \left[e^{\left[\frac{(\frac{G}{R}) \times L}{T_m}\right]} - 1\right]\right]}{\rho g}$$

wherein $\Delta P_{measured}$ is a drop in pressure $(P_1\text{-}P_2)$ that is measured via the hydrostatic tube output (24) and $P_{measured\ well\ head}$ is the pressure measure at the well head.

8. The system of claim 1, wherein the hydrostatic tube output (24) is configured to inject said inlet pressure regulated fluid below the gas/liquid interface of the pressurized tank or the gas reservoir, and the static tube output (26) is configured to measure the data parameters at a top of the pressurized tank or the gas reservoir.

9. The system of claim 1, wherein the data parameters include a differential pressure, a tank static pressure, a dynamic pressure, an ambient temperature, a gas flow and a tank temperature to derive a liquid level in the gas well.

10. The system of claim 1, wherein the instrument panel (10) further comprises a pressure sensor transmitter (22) operationally connectable to the multivariable transmitter (20) and the static tube output (26).

\* \* \* \* \*